Oct. 10, 1961 S. B. GRISCOM 3,004,116
AIR-BREAK DISCONNECTING SWITCH
Filed April 24, 1958 3 Sheets-Sheet 1

INVENTOR
Samuel B. Griscom
BY
Willard R. Crout
ATTORNEY

Oct. 10, 1961    S. B. GRISCOM    3,004,116
AIR-BREAK DISCONNECTING SWITCH
Filed April 24, 1958    3 Sheets-Sheet 3
Fig. 9.
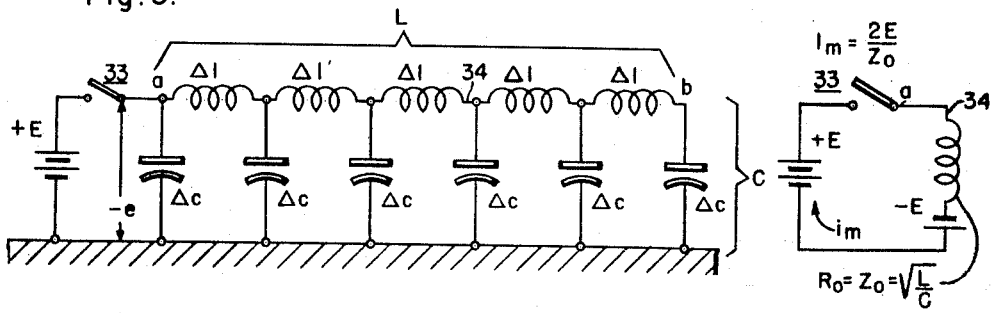
Fig. 10.
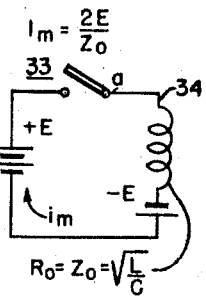
Fig. 11.
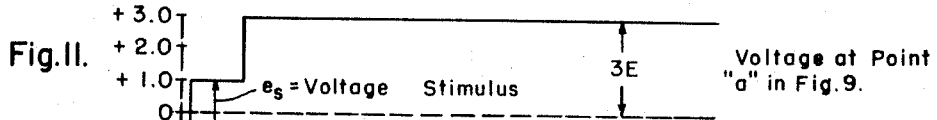
Voltage at Point "a" in Fig. 9.
Fig. 12.
Voltage at Point "b" in Fig. 9.
Fig. 13.
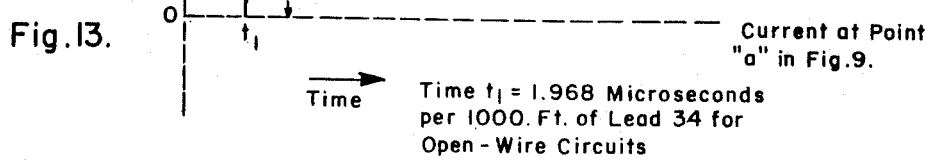
Current at Point "a" in Fig. 9.
Time $t_1$ = 1.968 Microseconds per 1000. Ft. of Lead 34 for Open-Wire Circuits
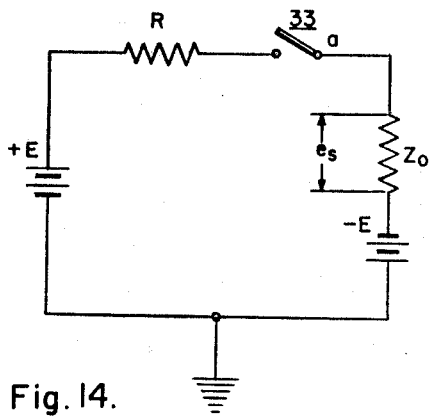
Fig. 14.
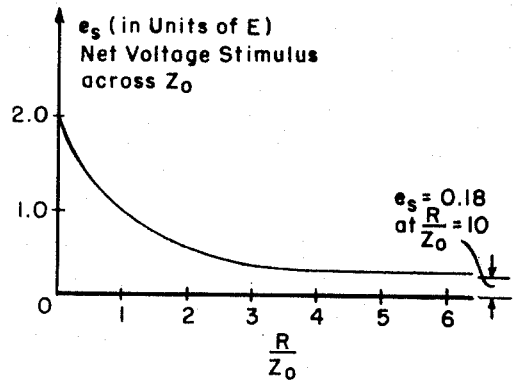
Fig. 15.

United States Patent Office 3,004,116
Patented Oct. 10, 1961

3,004,116
AIR-BREAK DISCONNECTING SWITCH
Samuel B. Griscom, Wilkinsburg, Pa., assignor to Westinghouse Electric Corporation, East Pittsburgh, Pa., a corporation of Pennsylvania
Filed Apr. 24, 1958, Ser. No. 730,692
11 Claims. (Cl. 200—48)

This invention relates to disconnecting switches of the air-break type in general, and, more particularly, to an improved high-voltage, air-break disconnecting switch having an adjacently disposed impedance assemblage, which is inserted into series circuit during the opening operation of the switch.

Switching surges accompanying the deenergization of unloaded lines and cables have become an increasingly important problem, in recent years, in the operation of high-voltage power systems. The use of higher transmission voltages, together with the trend toward reduced basic impulse levels of transmission apparatus, and reduced voltage ratings of lightning arresters, have rendered these systems more vulnerable than formerly to damage from switching surge overvoltages.

While switching surge phenomena have assumed most prominent importance on 345 kv. systems, it has occurred at other voltage levels, and I have discovered that this is undoubtedly the explanation for a number of apparatus failures at transmission voltages as low as 115 kv. The overvoltage surges resulting from disconnect switch operation are much more damaging to apparatus than are those associated with circuit breaker restriking, since there are so many more restrikes resulting from the relatively slow operation of the switch. The causes of a number of major equipment failures have been traced to switching surge overvoltages resulting from no-load, line-switching operations. Consequently, I have found that there is a definite need for remedial measures to suppress these overvoltages.

It is accordingly a general object of the present invention to provide an improved high-voltage, disconnecting switch of the air-break type which will suppress such overvoltages during switch operation.

Another object of the present invention is to provide an improved air-break, disconnecting switch having an adjacently disposed impedance assemblage, which is serially inserted into circuit during the opening operation, in which the arcing contacts, tapped to the impedance assemblage, will be spaced away from the arcuate path of opening travel of the switch blade to thereby prevent any ice formation on the contacts from interfering with proper operation of the switch.

A more specific object of the present invention is to provide an improved high-voltage switch of the air-break type, in which a resistor assemblage is disposed adjacent to the stationary contact of such switch, and is incrementally inserted into series circuit during the opening operation of the switch.

A further object of the present invention is to provide an improved resistor-equipped, air-break disconnecting switch, as set out in the immediately preceding paragraph, in which the electrical dimensioning of the resistor assemblage is related to the surge impedance of the connected circuit, such that surge overvoltages will be greatly minimized, or possibly completely eliminated.

Another object of the invention is to provide an improved air-break disconnecting switch of the high-voltage type having an impedance assemblage adjacent to the jaw-contact end of the switch, which is inserted into series circuit during the opening operation, in which the several arcing contacts, tapped to the impedance assemblage, are so configured as to grade the voltage substantially uniformly axially along the impedance assemblage.

A further object of the present invention is to provide an improved resistor-equipped, high-voltage, air-break disconnecting switch having the resistor assemblage electrically dimensioned in accordance with the surge impedance of the connected circuit, and inversely proportional to the opening current of the switch.

Another object of the invention is to provide a resistor-equipped, high-voltage, air-break disconnecting switch of simple construction, effective in operation and with the resistance assemblage so dimensioned electrically as to prevent the occurrence of overvoltage surges on the line during switching operation.

Another object of the invention is to provide an improved air-break disconnecting switch of the high-voltage type utilizing an impedance assemblage, incrementally inserted into series circuit during the opening operation, such that corona formation will be considerably minimized, or even eliminated.

Further objects and advantages will readily become apparent upon reading the following specification, taken in conjunction with the drawings, in which.

Figures 3, 4:
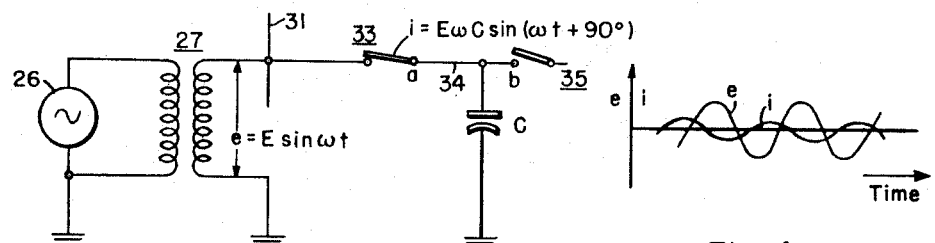
FIG. 3 is a single-phase diagram including elements associated with a disconnecting switch.
FIG. 4 is a graphical representation of the current and voltages encountered in the circuit of FIG. 3.
Figures 5, 6:
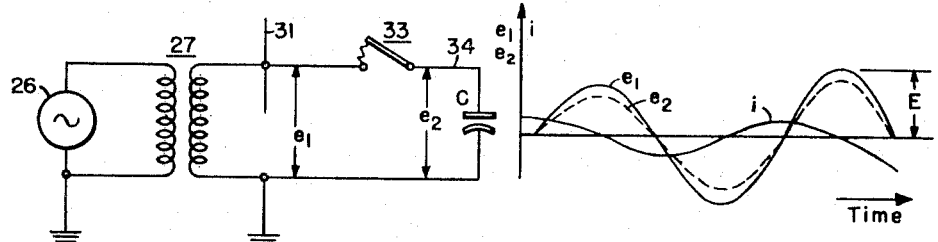
Figures 7, 8:
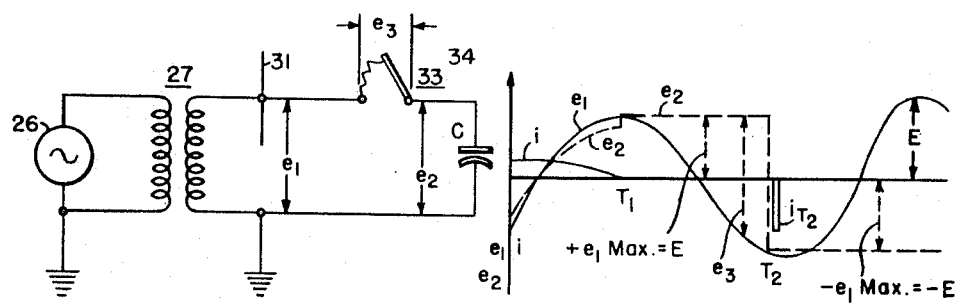

FIG. 5 ilustrates the circuit of FIG. 3 with the disconnecting switch contacts only slightly separated and establishing arcing during the opening operation;

FIG. 6 graphically illustrates the current and voltages present in the circuit of FIG. 5;

FIG. 7 illustrates the circuit of FIGS. 3 and 5 at a later step in the opening operation with a wider contact separation distance;

FIG. 8 illustrates current and voltage values in accordance with the conditions present in the electrical circuit of FIG. 7;

FIG. 9 illustrates a connecting lead in its fundamental form as including a series of infinitesimally small sections of inductances, and also capacitances to ground;

FIG. 10 illustrates a circuit illustrating the behavior of the circuit of FIG. 9 during an imposition of a surge voltage;

FIGS. 11–13 illustrate voltages and currents at certain points on the circuit of FIG. 9 in accordance with traveling-wave theory;

FIG. 14 illustrates a circuit in which a disconnecting switch is equipped with a resistance, serially connected into the circuit during the opening operation; and, FIG. 15 illustrates the relationship between the net voltage stimulus $e_s$ as a function of $R/Z_0$.

Figure 1:
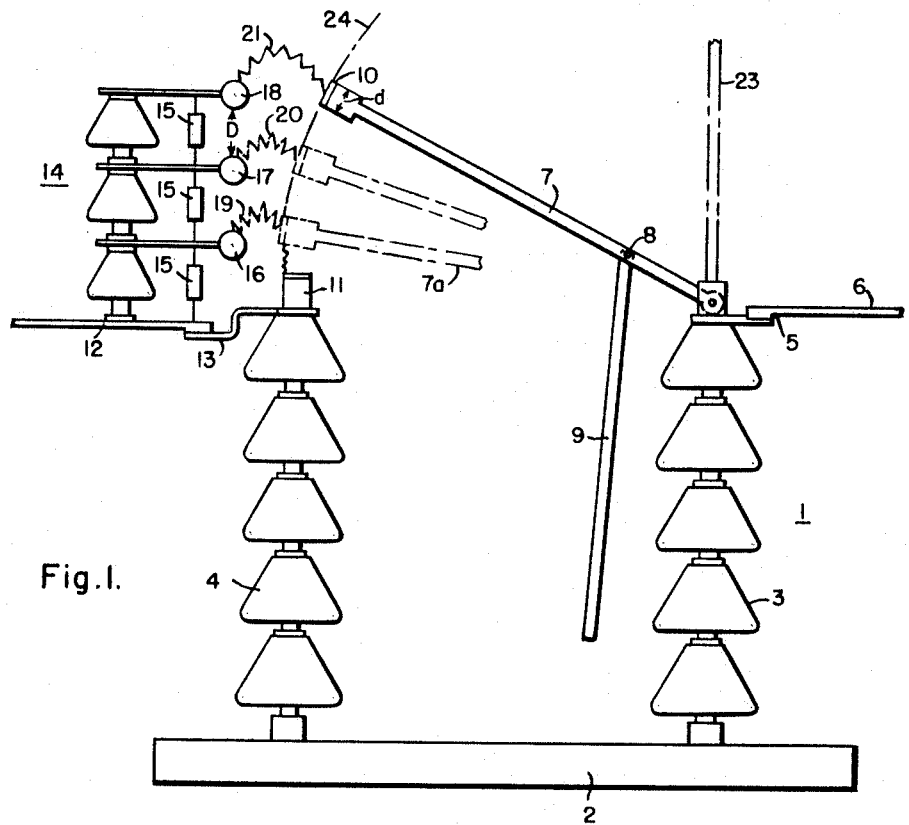
FIGURE 1 is a side elevational view, partially diagrammatic, of an air-break disconnecting switch embodying the principles of the present invention, and shown at an intermediate step in the opening operation.

Referring to the drawings, and more particularly to FIG. 1 thereof, the reference numeral 1 generally designates an air-break disconnecting switch including a base 2 and a pair of insulator columns 3, 4. The insulator column 3 supports a line terminal, designated by the reference numeral 5, to which a line connection 6 may be made. The line terminal 5 also pivotally supports a swinging, movable disconnecting blade 7. The disconnecting blade 7 is pivotally connected, as to 8, to an insulating link 9, which may be actuated by any suitable mechanism.

The outer end 10 of the movable switch blade 7 makes contacting engagement with a relatively stationary jaw contact 11, the latter being supported at the upper end of the insulator column 4.

A line terminal 12 is fixedly secured, by a conducting strap 13, to the stationary jaw contact 11. Extending upwardly from the line terminal 12 is a stationary impedance assemblage, generally designated by the reference numeral 14, and including, in this particular instance, three resistance sections 15. The resistance sections 15, as shown, are connected to spherical arcing contacts 16, 17, 18, to which the arc, drawn during the opening operation, successively transfers, as indicated by the dotted lines 19, 20, 21. The spherical arcing contacts 16-18 have a resulting smooth configuration to prevent the formation of corona, which might cause radio interference. Also the capacitance between the spherical arcing contacts grades the voltage uniformly along the impedance assemblage. The arcing contacts 16-18 could have other configurations than spherical and still possess sufficient capacitance for uniform voltage grading. It will be noted that the lateral dimension $d$ of the free end 10 of the movable switch blade 7 is less than the longitudinal spacing $D$ between the arcing contacts 16, 17 and 18.

During the opening operation, the insulating link 9 effects clockwise, rotative motion of the movable disconnecting switch blade 7, first causing its separation from the stationary jaw contact 11. An arc is obviously established between contacts 10, 11, but when movable contact 10 is adjacent to arcing contact 16, as indicated by the switch blade position 7a, the lower end of the established arc will transfer to the spherical arcing electrode 16, as indicated by the arc position 19.

Continued upward opening movement of the movable disconnecting contact 10 along an arcuate path of travel 24 will cause the arc 19 to move upwardly to the arc position 20, thereby inserting a section 15 of impedance assemblage 14 into series circuit. Further opening movement of disconnecting blade 7 will cause continued arcuate movement of movable contact 10 at the outer free end thereof, thereby causing movement of the arc 20 to the next arc position 21, thus inserting the entire impedance or resistance assemblage 14 into series circuit. Continued opening motion of movable switch blade 7 will lengthen the uppermost arc 21 until extinction occurs. As well known by those skilled in the art, the movable disconnecting switch blade 7 will continue to rise until it attains the fully open-circuit position indicated by the dotted line 23.

It is an important feature of the present invention to electrically dimension the resistance assemblage 14 such that effective prevention of transient voltage surges is attained during the opening and closing operation of the disconnecting switch 1. To understand the surge problem confronted by the switching or deenergizing of energized lines, such as those within a switching station, a theoretical analysis is presented below.

This invention provides a means of improving the performance of a disconnecting switch, or isolator, to the end that its operation when opening or closing on a power system energized at normal A.-C. voltage will not result in high transient overvoltages prospectively injurious to other apparatus. In order to demonstrate the functioning and the electrical dimensioning of the means, it is necessary to describe in detail some phenomena encountered in the operation of disconnecting switches, some of which are well understood by those familiar to the art, but some of which have not heretofore been recognized.

Figure 2:
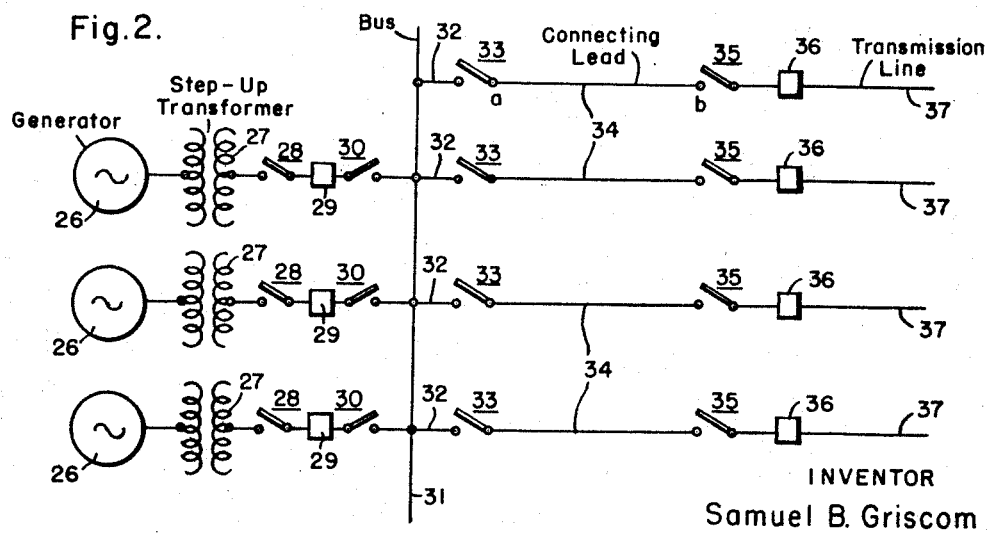
FIG. 2 shows, in a conventional one-line diagrammatic form, part of a three-phase, 60-cycle power system.

FIG. 2 shows, in a conventional one-line diagrammatic form, part of a three-phase, 60-cycle power system.

Generators 26 supply power to step-up transformers 27. The transformers 27 supply power through disconnecting switches 28, circuit breakers 29, and through disconnecting switches 30 to a bus 31. Connected to the bus 31, by connecting leads 32, are disconnecting switches 33. Connecting leads 34 feed power through disconnecting switches 35 and circuit breakers 36 to transmission lines 37. The transmission lines 37 carry the power to remote places, where, through step-down transformers, not shown, the power is available at a suitable lower voltage, which may be used. The voltage on the transmission lines 37 may, for example, be 345,000 volts, line-to-line, three phase.

In normal full capacity operation, all of the disconnecting switches 28, 30, 33, 35 and circuit breakers 29, 36 will be closed. However, on occasion, to perform maintenance work, or rearrange connections (particularly in more complex diagrams of connection), it is necessary to disconnect, and later reconnect, elements of the system. As an illustration, consider the connecting lead circuit 34 between disconnecting switches 33, 35. To deenergize this lead 34, circuit breaker 36 is first opened, thus relieving the lead 34 of the load current normally flowing in the transmission line 37. At this time disconnecting switch 33 may be opened, freeing the lead 34 from the power system. Or, what is more common, disconnecting switch 35 is first opened, and then disconnecting switch 33. For purposes of simplification, it will be assumed that disconnecting switch 35 has been opened, and disconnecting switch 33 is then opened. When disconnecting switch 33 is opened, transient currents and voltages occur. The transients involve components of both the power frequency (60 c.p.s.) and higher frequencies. It is convenient to consider these components separately to bring out certain facts.

FIG. 3 is a single-phase circuit diagram, simplified to include only those elements pertinent to that part of the phenomena, which is essentially of 60-cycle frequency. When disconnecting switch 33 is closed, a current of 60-cycle frequency flows due to the capacitance C of the lead 34 to ground. In practice, this current may be as high as 10 amperes, although in the usual case is more like ½ ampere for leads within a given switching station. The current is 90° advanced in phase with respect to the voltage, as illustrated in FIG. 4.

FIG. 5, which illustrates the circuit of FIG. 3 somewhat simplified, illustrates the disconnecting switch 33 when it has opened only slightly, drawing a short arc between the movable disconnecting blade and stationary jaw contact. There will be a barely perceptible reduction in voltage $e_2$ across capacitor C, exaggerated in FIG. 6 to show the effect. When the current $i$ goes through zero, $e_2$ temporarily remains constant. The arc and arc current quickly reestablish themselves shortly after the current zero by reason of the postulate that the disconnecting switch 33 is open so small an amount, that the air gap between the movable blade and stationary jaw contact has insufficient dielectric strength to withstand the voltage difference, to which it is subjected.

Next consider FIG. 7, in which the disconnecting switch 33 is postulated to be nearly so far open that the arc will permanently extinguish. FIG. 8 shows, up to time $T_1$, a condition of continuous arcing. At $T_1$ it is presumed, according to the postulate of a wide separation of movable blade contact and stationary jaw contact, that sufficient dielectric strength may exist to prevent immediate re-establishment of the arc. The capacitor C (or the lead 34) is then left charged to the crest value E of the source system. The source voltage $e_1$ continues its sinusoidal variation with time, resulting in a continuous increase in voltage $e_3$ between the contacts of the switch 33, this difference voltage ultimately reaching twice the crest value of $e_1$, or E, to ground. Within the postulate of the switch 33 being about far enough open that the arcing is about to cease, the arc may or may not restrike at time $T_2$.

In FIG. 8 such a restrike is shown to occur, but to immediately extinguish. This description of the 60-cycle phenomena is a standard work, and more details may be found in the literature.

In the foregoing, no attempt was made to describe the current pulse $i_{T_2}$ that occurs when the arc momentarily reestablishes, nor to the exact shape or magnitude of the voltage $E_2$ as it changes in the vicinity of time $T_2$. This is also a standard work, and will be briefly discussed below.

In FIG. 9 the lead 34 is shown in its fundamental form, which is a series of infinitesimally small sections of inductances $\Delta l$, shunted to ground by infinitesimally small capacitances $\Delta c$. The source is shown as a battery of zero impedance of voltage $+E$ (the source will not necessarily be of zero, or low impedance, but is considered so for simplicity). The lead section 34 is shown as initially charged to $-E$ volts, thus corresponding to the conditions existing at time $T_2$, FIG. 8. The sinusoidal variation of the source voltage is neglected thenceforth as being too slowly changing to affect the phenomena.

According to conventional theory, the lead section 34 behaves initially as thought it were a resistor of ohmic value $$Z_0 = \sqrt{l/c} = \sqrt{L/C}$$

Hence, when disconnecting switch 33 closes, corresponding to a restriking of the arc in the disconnecting switch 33, the initial behavior of the circuit is exactly the same as the behavior of the circuit shown in FIG. 10. That is, a current flow of $$\frac{2E}{Z_0}$$

will occur, and point "a" will change from $-E$ to $+E$ with respect to ground practically instantaneously.

It is of particular interest to note that the "making" current $$i_m = \frac{2E}{Z_0}$$

is dependent, with E fixed, solely upon $$Z_0 = \sqrt{L/C} = \sqrt{l/c}$$

and is, therefore, independent of the length of the lead section $a-b$ of FIG. 9. This is in contrast to the 60-cycle charging current, shown in FIGS. 3 and 4 to be proportional to the total capacitance C of the lead section 34. The quantity $Z_0$ is the surge impedance of the lead 34, and for ordinary open-wire circuits is usually numerically close to 400 ohms.

It is of further interest to become oriented by numerical examples. On a 345,000-volt, line-to-line, three-phase system, the R.M.S. voltage from one phase to ground is 200,000 volts, and its crest value E is 282,000 volts. The making current $i_m$ for a disconnecting switch on such a system, when it restrikes while in the process of opening a single open-wire lead 34, is therefore:

$$i_m = \frac{2 \times 282,000}{400} = 1410 \text{ amperes}$$

This is the magnitude of the current "pip" shown at $T_2$ in FIG. 8, and, as previously stated, is independent of the length of the lead 34 being switched. In contrast, the magnitude of the 60-cycle component of current is proportional to the length of the lead 34, and varies from nearly zero to possibly 15 amperes crest value.

The making current $i_m$ does not remain equal to $$\frac{2E}{Z_0}$$

very long, nor does the voltage of point "a" on the lead 34 of FIG. 10 remain at $+E$ volts. Standard traveling-wave theory reveals that the voltages and current relations shown in FIGS. 11–13 will obtain, assuming that the arc extinguishes, as shown. Whether the arc extinguishes or not is immaterial to the functioning of this invention.

It is important to note from FIG. 11 that the voltage stimulus $e_s$ (the total change in voltage of point "a" when the arc restrikes) is eventually doubled and added algebraically to the initial voltage of point "a" in determining the maximum voltage reached on the lead 34.

FIG. 14 shows a resistor R in series with the disconnecting switch to the source, following the equivalent circuit method of obtaining the conditions existing at the instant of arch restrike. Analysis of this equivalent circuit leads to the graph of FIG. 15, which shows the net voltage stimulus $e_s$ across $Z_0$ (in units of E) as a function of $R/Z_0$. Thus, the net voltage stimulus $e_s$ across $Z_0$ in FIG. 14 is equal to the making current $i_m$ times the surge impedance $Z_0$. But since $$i_m = \frac{2E}{R+Z_0}$$

by substitution, $$e_s = \left(\frac{2E}{R+Z_0}\right) Z_0$$

Values of $e_s$, plotted in units of E against $$\frac{R}{Z_0}$$

are shown in FIG. 15. From FIG. 15 it will be noted that if $R/Z_0 = 1$, that is, $R = Z_0$, the net voltage stimulus $e_s$ will be halved, compared to the value with no resistor R.

Further reduction in voltage stimulus and therefore overvoltage is obtainable with higher values of R. It must be considered that the simple case of a straight, open wire lead, such as lead 34, is not the worst possible case. In practice, leads opened by disconnecting switches usually have complexities due to stubs to other disconnecting switches, capacitances of insulators, apparatus bushings, transformers, etc. Such complexities can result in more than three times normal voltage to ground, with a stimulus of 2E, with a single arc restrike. Multiple arc restrikes can further increase overvoltages. On the other hand, the system impedance will never be zero, which is an influence in the direction of decreasing the amount of transient overvoltage. In interpreting the curve of FIG. 15, it must be recognized that the surge impedance $Z_0$ is the surge impedance of the circuit connected at point "a" to disconnecting switch 33 in FIG. 2, and not necessarily the surge impedance of a single line. Stub leads and extra capacitances will lower the surge impedance, as seen at point "a" in FIG. 2.

FIG. 15 indicates that the higher the ohmic value of resistor R, the greater the reduction of overvoltages, and suggests the selection of a high ohmic resistor. However, the energy loss in the resistor is closely proportional to its ohmic value, and a high value of resistance requires a physically large resistance to avoid overheating. As shown in FIG. 1, means are provided such that the resistance R is inserted into the circuit only during the opening stroke of the switch, thereby minimizing the thermal duty. Despite this, the heating is considerable, and is of importance in physical design structures, which must make due allowance for slow openings and successive operations. As an example, a switch using a 4000-ohm resistor R ($10 \times Z_0$ of 400 ohms) and opening 5 amperes would develop 100 kw. loss, and would require a moderately large mass to withstand successive operations.

It has been discovered that if the resistance R, to be inserted into the series circuit during the opening operation, is electrically dimensioned to be within the range of 1 to 300 times the surge impedance $Z_0$ of the circuit section connected to one side of the disconnecting switch ($Z_0$ of lead 34 in FIG. 2, for example, divided by $1+(i_{opening})^2$ where $i_{opening}$ is the opening current of the switch without the benefit of the resistance, that is a proper resistance value of R will be obtained. If the disconnecting switch has a higher surge impedance $Z_0$ on one side than the other, the larger value of $Z_0$ is chosen for the above calculation. In other words, R has the following limits:

$$R_{min.} = Z_0 \qquad R_{max.} = 300 Z_0 \text{ [ohms]}$$

where $Z_0$ is the larger of the two surge impedances of the two circuits connected to the disconnecting switch under discussion, and $i_{opening}$ is the opening current in amperes of the switch, without benefit of an insertion resistance.

In the interest of obtaining a value of R, which is most beneficial in eliminating, or greatly reducing surge overvoltages, the value of R may be taken within the range of one to five times $Z_0$. A particularly desirable and advantageous ranges of values of R, in ohms, is two to four times $Z_0$. Generally $R=3Z_0$ may be employed with advantageous results. R is the sum of the three resistance sections 15 of FIG. 1.

If it is not desired to calculate the ohmic resistance value of R in terms of the surge impedance $Z_0$, then, generally, if R falls within the range of 1200 to 1800 ohms advantageous results are obtained on many circuits. Preferably the range of values of R fall within the more limited range of 1400 to 1600 ohms. For many applications R may be substantially 1500 ohms for preventing overvoltage surges. Thus, each resistance section 15 in FIG. 1 is 500 ohms, so R equaled 1500 ohms.

From the foregoing description of the invention, it will be apparent that there is provided an improved disconnecting switch particularly suitable for dropping leads in a switching station, or at other locations, in which the charging currents involved may be substantially 12 amperes or less.

A usual range of load currents for high-voltage air-break disconnecting switches is 400 amperes to 1200 amperes. Thus it is evident that the charging current to be interrupted by the air-break disconnecting switch is a small fraction of the normal load current carried by the switch.

The invention is not concerned with disconnecting switches employed to interrupt heavy load currents of amperage rating much over 12 amperes. As will be obvious, the present invention is particularly concerned with high-voltage switching.

As set out above, various methods have been disclosed for calculating the resistance, in ohms, of the resistance R, which is to be inserted into series circuit during the opening operation. By an application of the present invention, switching surge overvoltages may be greatly reduced in magnitude, or even entirely eliminated. Consequently, connected apparatus is not highly stressed electrically, and there is no imposition of high, transient, surge overvoltages upon the circuit elements. Arc lengthening is reduced, and operation of the disconnecting switch is considerably improved.

Although there has been shown and described a specific impedance-equipped disconnecting switch, it is to be clearly understood that the same was merely for the purposes of illustration, and that changes and modifications may readily be made therein by those skilled in the art, without departing from the spirit and scope of the invention.

I claim as my invention:

1. The combination in an air-break disconnecting switch of insulating means for supporting a relatively stationary contact, said insulating means also supporting a swinging, movable, disconnecting switch blade, the swinging, movable disconnecting switch blade making contacting egagement with the relatively stationary contact in the closed circuit position of the switch, means for effecting opening swinging movement of the movable diconnecting switch blade in an arcuate path away from the relatively stationary contact to establish an arc therewith during the opening operation of the switch, an impedance assemblage including a plurality of impedance sections disposed adjacent to said relatively stationary contact and extending away therefrom in the general direction of the opening path of movement of the free end of the movable switch blade, a plurality of spaced arcing contacts tapped to said impedance sections, said arc between the end of the movable switch blade and the relatively stationary contact transferring successively to the plurality of spaced arcing contacts to incrementally insert said impedance sections into series circuit during the opening operation of the switch, the lateral dimension of the free end of the movable switch blade being less than the longitudinal spacing between the spaced arcing contacts of the impedance assemblage, the capacitance between the arcing contacts assisting in grading the voltage lengthwise along the impedance assemblage during the opening operation, and means spacing said arcing contacts away from the path of opening movement of the free end of the movable switch blade so that ice formation will not impede opening switch movement.

2. A disconnecting switch for isolating an electrical circuit including a relatively stationary contact, a movable disconnecting contact cooperable with the relatively stationary contact in the closed-circuit position and separable therefrom during the opening operation of the switch, an impedance assemblage including a plurality of impedance sections disposed adjacent to said relatively stationary contact, a plurality of spaced arcing contacts tapped to said impedance sections and disposed adjacent the path of opening travel of said movable disconnecting contact, the opening movement of the movable disconnecting contact causing successive insertion of said plurality of impedance sections into series circuit during the opening operation to reduce overvoltage surges on said electrical circuit, the lateral dimension of the free end of the movable disconnecting contact being less than the longitudinal spacing between the spaced arcing contacts of the impedance assemblage, and said spaced arcing contacts being of such configuration in shape as to constitute electrostatic grading shields to substantially uniformly grade the voltage lengthwise along said impedance assemblage so that the sparkover voltage from end to end of said impedance assemblage will be sufficient for proper operation of the switch.

3. A disconnecting switch for isolating an electrical circuit including a relatively stationary contact, a movable disconnecting contact cooperable with the relatively stationary contact in the closed circuit position and separable therefrom during the opening operation of the switch, an impedance assemblage including a plurality of impedance sections disposed adjacent to said relatively stationary contact, a plurality of spaced arcing contacts tapped to said impedance sections and disposed adjacent the path of opening travel of said movable disconnecting contact, the opening movement of the movable disconnecting contact causing successive insertion of said plurality of impedance sections into series circuit during the opening operation to reduce overvoltage surges on said electrical circuit, the lateral dimension of the free end of the movable disconnecting contact being less than the longitudinal spacing between the spaced arcing contacts of the impedance assemblage, and said spaced arcing contacts being each of spherical shape to substantially uniformly grade the voltage lengthwise along said impedance assemblage so that the sparkover voltage from end to end of said impedance assemblage will be sufficient for proper operation of the switch.

4. An air-break, resistor-equipped, disconnecting switch including a spaced pair of insulator columns, a relatively stationary contact mounted at the end of one insulator column, a swinging, movable disconnecting switch blade supported at the end of the other insulator column, actuating means for causing swinging, opening travel of the free end of said disconnecting switch blade away from the relatively stationary contact along an arcuate path of travel, a resistor assemblage including a plurality of resistor sections supported adjacent said relatively stationary contact, a plurality of arcing contacts physically spaced away from said arcuate path of travel and tapped to said resistor sections, the lateral dimension of the free end of the movable swinging disconnecting switch blade being less than the longitudinal spacing between the spaced arcing contacts of the resistor assemblage, the capacitance between the arcing contacts assisting in grading the voltage lengthwise along the resistor assemblage, and the swinging, opening travel of the end of said movable disconnecting switch blade causing arc transfer successively to said arcing contacts so that said resistor sections are incrementally inserted into series circuit.

5. A high-voltage disconnecting switch operable to deenergize lead circuits in a switching station involving charging currents of not substantially much over 12 amperes R.M.S. value including relatively movable contact means for isolating the two lead circuits connected to the two terminals of said disconnecting switch, a resistance of ohmic value R, means for inserting said resistance R into series circuit during the opening operation of the disconnecting switch, and the ohmic value of R falling within the range $$\frac{Z_0}{1+(i_{opening})^2} < R < \frac{300 Z_0}{1+(i_{opening})^2}$$

where $Z_0$ is the larger of the surge impedance values of said two lead circuits if there is a difference, and $i_{opening}$ is the opening current in amperes of said switch without the benefit of resistance R.

6. A high-voltage disconnecting switch operable to deenergize lead circuits in a switching station involving charging currents which are a small fraction of the normal load current of the switch including relatively movable contact means for isolating the two lead circuits connected to the two terminals of said disconnecting switch, a resistance of ohmic value R, means for inserting said resistance R into series circuit during the opening operation of the disconnecting switch, and the ohmic value of R falling within the range $Z_0 < R < 5Z_0$ where $Z_0$ is the larger of the surge impedance values of said two lead circuits if there is a difference.

7. A high-voltage disconnecting switch operable to deenergize lead circuits in a switching station involving charging currents of not substantially much over 12 amperes R.M.S. value including relatively movable contact means for isolating the two lead circuits connected to the two terminals of said disconnecting switch, a resistance of ohmic value R, means for inserting said resistance R into series circuit during the opening operation of the disconnecting switch, and the ohmic value of R falling within the range $2Z_0 < R < 4Z_0$ where $Z_0$ is the larger of the surge impedance values of said two lead circuits if there is a difference.

8. A high-voltage disconnecting switch operable to deenergize lead circuits in a switching station involving charging currents which are a small fraction of the normal load current of the switch including relatively movable contact means for isolating the two lead circuits connected to the two terminals of said disconnecting switch, a resistance of ohmic value R, means for inserting said resistance R into series circuit during the opening operation of the disconnecting switch, and the ohmic value of R being substantially equal to $3Z_0$, where $Z_0$ is the larger of the surge impedance values of said two lead circuits if there is a difference.

9. A high-voltage disconnecting switch operable to deenergize lead circuits in a switching station involving charging currents of not substantially much over 12 amperes R.M.S. value including relatively movable contact means for isolating the two lead circuits connected to the two terminals of said disconnecting switch, a resistance of ohmic value R, means for inserting said resistance R into series circuit during the opening operation of the disconnecting switch, and the ohmic value of R is between 1200 and 1800 ohms.

10. A high-voltage disconnecting switch operable to deenergize lead circuits in a switching station involving charging currents which are a small fraction of the normal load current of the switch including relatively movable contact means for isolating the two lead circuits connected to the two terminals of said disconnecting switch, a resistance of ohmic value R, means for inserting said resistance R into series circuit during the opening operation of the disconnecting switch, and the ohmic value of R is between 1400 and 1600 ohms.

11. A high-voltage disconnecting switch operable to deenergize lead circuits in a switching station involving charging currents of not substantially much over 12 amperes R.M.S. value including relatively movable contact means for isolating the two lead circuits connected to the two terminals of said disconnecting switch, a resistance of ohmic value R, means for inserting said resistance R into series circuit during the opening operation of the disconnecting switch, and the ohmic value of R is substantially 1500 ohms.

References Cited in the file of this patent
UNITED STATES PATENTS

| | | |
|---|---|---|
| 1,563,833 | Christensen | Dec. 1, 1925 |
| 1,861,129 | Milliken | May 31, 1932 |
| 2,586,290 | Baker et al. | Feb. 19, 1952 |